United States Patent
Ivanov et al.

(10) Patent No.: US 8,729,877 B2
(45) Date of Patent: May 20, 2014

(54) FAST STARTUP ALGORITHM FOR LOW NOISE POWER MANAGEMENT

(75) Inventors: Vadim V. Ivanov, Tucson, AZ (US); Harish Venkataraman, Wylie, TX (US); Daniel A. King, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 181 days.

(21) Appl. No.: 13/230,963

(22) Filed: Sep. 13, 2011

(65) Prior Publication Data
US 2013/0063110 A1 Mar. 14, 2013

(51) Int. Cl.
*G05F 1/563* (2006.01)

(52) U.S. Cl.
USPC .......................................... 323/281; 323/901

(58) Field of Classification Search
USPC ......... 323/224, 280, 281, 901, 268, 271, 277; 363/49
See application file for complete search history.

(56) References Cited

U.S. PATENT DOCUMENTS

| | | | |
|---|---|---|---|
| 5,553,296 A * | 9/1996 | Forrest et al. | 713/323 |
| 6,873,322 B2 * | 3/2005 | Hartular | 345/212 |
| 6,901,273 B2 * | 5/2005 | Lutnaes | 455/566 |
| 6,933,772 B1 | 8/2005 | Banerjee et al. | |
| 7,148,666 B1 | 12/2006 | Tai et al. | |
| 7,282,895 B2 | 10/2007 | Thiele et al. | |
| 7,466,115 B2 * | 12/2008 | Biagi | 323/280 |
| 7,973,487 B2 * | 7/2011 | Vaucourt et al. | 315/224 |
| 2008/0197821 A1 * | 8/2008 | Hasegawa et al. | 323/238 |
| 2010/0253301 A1 * | 10/2010 | Nakada et al. | 323/282 |
| 2011/0156672 A1 * | 6/2011 | Gakhar et al. | 323/280 |

OTHER PUBLICATIONS

"A Low Voltage, Dynamic, Noninverting, Synchronous Buck-Boost Converter for Portable Applications," IEEE Transactions on Power Electronics, vol. 19, No. 2, Mar. 2004, pp. 443-452 (Sahu, et al.).
"Low-Dropout Regulators With Adaptive Reference Control and Dynamic Push—Pull Techniques for Enhancing Transient Performance," IEEE Transactions on Power Electronics, vol. 24, No. 4, Apr. 2009, pp. 1016-1022 (Lin, et al.).
U.S. Appl. No. 13/134,762, filed Jun. 16, 2011.
U.S. Appl. No. 13/230,972, filed Sep. 13, 2011.

* cited by examiner

*Primary Examiner* — Adolf Berhane
*Assistant Examiner* — Jye-June Lee
(74) *Attorney, Agent, or Firm* — Alan A. R. Cooper; W. James Brady, III; Frederick J. Telecky, Jr.

(57) ABSTRACT

A method is provided. A low dropout regulator (LDO) is disabled during a first mode, and a first reference voltage is selected and applied to a switched-mode converter during the first mode. Also during the first mode, a first output voltage is generated by the switched-mode converter from a power supply, and a first capacitor is overcharged with the first output voltage. The LDO is then enabled during a second mode. During a first portion of a startup period for the second mode, a second capacitor is charged from the first capacitor, and a second reference voltage is selected and applied to the switched-mode converter. Then, during a second portion of the startup period for the second mode, the second capacitor is charged with the switched-mode converter.

16 Claims, 3 Drawing Sheets

FAST STARTUP ALGORITHM FOR LOW NOISE POWER MANAGEMENT

TECHNICAL FIELD

The invention relates generally to power management and, more particularly, to power management in a low noise environment.

BACKGROUND

Turning to FIG. 1, an example of a system 100 that employs a buck converter 102 in conjunction with an LDO 104 (which provides power from a battery BAT to a powered circuit 106) can be seen. As shown, the buck converter 102 is generally comprised of a plant (which is generally a driver circuit 110, transistors Q1 and Q2, an inductor L, and a capacitor C1) and a controller (which is generally an error amplifier 112, voltage source 114, a pulse width modulator or PWM 108, and a voltage divider R1/R2), and the LDO 104 is generally comprised of an amplifier 116, a transistor Q3, a voltage source 118, and a capacitor C2. In this example, voltage source 114 provides a reference voltage $V_{DCREF}$ to error amplifier 112 such that voltage $V_{OUT}$ (which is generated by buck converter 102 from battery BAT) is greater than reference voltage $V_{LDOREF}$ (by, for example 200-300 mV) in order to decrease the power loss in LDO 104 (which is proportional to its dropout).

In order to save energy, LDO 104 can be disabled (i.e., high impedance output) when high noise can be tolerated, and voltage VDD can be set by a secondary power source (i.e., shorted to ground or left floating). Without a load, buck converter 102 can consume very small amount of current (i.e., down to about 50 nA) and does not have to be turned off. When LDO 104 is re-enabled (during startup), LDO 104 begins charging capacitor C2 to a desired level. Under these circumstances, the output current from LDO 104 can be set very high (which is limited set by the size of transistor Q3 and additional current-limiting circuitry inside, if any), but charging of capacitor C2 is typically limited by the maximum output current of the buck converter 102 (i.e., size of inductor L and transistors Q1 and Q2).

Turning to FIG. 2, a diagram depicting an example of voltage VDD during the startup or re-enabling of LDO 104 can be seen. As shown in this example, when LDO 104 is "off" prior to time T1, voltage VDD is approximately at ground. Then at time T1, the enable signal EN is asserted to enable LDO 104, and capacitor C2 is charged until time T4, when it reaches reference voltage REF1. This delay (due to the charging of capacitor C2) can be quite lengthy, so there is a need for an improved power management circuit.

Some other examples of conventional circuits are: U.S. Pat. No. 6,873,322; U.S. Pat. No. 6,933,772 U.S. Pat. No. 7,148,666 U.S. Pat. No. 7,282,895; Sahu et al., "A Low Voltage, Dynamic, Noninverting, Synchronous Buck-Boost Converter for Portable Applications," IEEE Trans. on Power Electronics, Vol. 19, No. 2, March 2004, pp. 443-452; and Lin et al., "Low-Dropout Regulators With Adaptive Reference Control and Dynamic Push-Pull Techniques for Enhancing Transient Performance," IEEE Trans. on Power Electronics, Vol. 24, No. 4, April 2009, pp. 1016-1022.

SUMMARY

An embodiment of the present invention, accordingly, provides an apparatus. The apparatus comprises a linear regulator having a first capacitor; and a switched-mode converter having: a plant that receives an input current and an input voltage and that is coupled to the linear regulator, wherein the plant includes a second capacitor; a first controller that is coupled to the plant and that controls the plant; a switch network that is coupled to the first controller and that receives a first reference voltage and a second reference voltage, wherein the second reference voltage is greater than the first reference voltage; and a second controller that provides a control signal to the switch network, wherein the second controller enables the switch network to provide the second reference voltage to the first controller when the linear regulator is disabled so as to overcharge the capacitor, and wherein the second capacitor charges the first capacitor during a first portion of a startup period for the linear regulator, and wherein the second controller enables the switch network to provide the first reference voltage to the first controller during a second portion of the startup period.

In accordance with an embodiment of the present invention, the linear regulator further comprises a low dropout regulator (LDO) having: a transistor having a first passive electrode, a second passive electrode, and a control electrode, wherein the first passive electrode of the transistor is coupled to the plant; an amplifier having a first input terminal, a second input terminal, and an output terminal, wherein the first input terminal of the amplifier receives a third reference voltage, and wherein the second input terminal of the amplifier is coupled to the second passive electrode of the transistor, and wherein the output terminal of the amplifier is coupled to the control electrode of the transistor; and a second capacitor that is coupled to the second passive electrode of the transistor.

In accordance with an embodiment of the present invention, the transistor further comprises a first transistor, and wherein the plant further comprises: a second transistor having a first passive electrode, a second passive electrode, and a control electrode, wherein the first passive electrode of the second transistor receives the input current and voltage; a third transistor having a first passive electrode, a second passive electrode, and a control electrode, wherein the first passive electrode of the third transistor is coupled to the second passive electrode of the second transistor at a switching node; an inductor that is coupled between the switching node and an output node, wherein the first output current and voltage are provided at the output node, and wherein the first capacitor is coupled to the output node; and a driver circuit that is coupled to the control electrodes of the second and third transistors.

In accordance with an embodiment of the present invention, the first controller further comprises: a voltage divider that is coupled to the output node; an error amplifier that is coupled to the voltage divider and the switch network; and a pulse width modulator (PWM) that is coupled to the error amplifier and the driver circuit.

In accordance with an embodiment of the present invention, the switch network further comprises: a first switch that is coupled to the error amplifier, that receives the first reference voltage, and that is controlled by the second controller; and a second switch that is coupled to the error amplifier, that receives the second reference voltage, and that is controlled by the second controller.

In accordance with an embodiment of the present invention, an apparatus is provided. The apparatus comprises a power supply; a touch screen controller having a first mode and a second mode; a linear regulator having a first capacitor, wherein the linear regulator is coupled to the touch screen controller, and wherein the linear regulator is disabled during the first mode of the touch screen controller, and wherein the linear regulator is enabled during the second mode; and a switched-mode converter having: a plant that is coupled between the linear regulator and the power supply, wherein the plant includes a second capacitor; a first controller that is coupled to the plant and that controls the plant; a switch network that is coupled to the first controller and that receives a first reference voltage and a second reference voltage, wherein the first reference voltage is greater than the second reference voltage; and a second controller that provides a control signal to the switch network, wherein the second controller enables the switch network to provide the first reference voltage to the first controller during the first mode so as to overcharge the capacitor, and wherein the second capacitor charges the first capacitor during a first portion of a startup period for the second mode, and wherein the second controller enables the switch network to provide the second reference voltage to the first controller during a second portion of the startup period for the second mode.

In accordance with an embodiment of the present invention, the first transistor further comprises a PMOS transistor, and wherein the second and third transistors further comprise first and second NMOS transistors.

In accordance with an embodiment of the present invention, the power supply is a battery.

In accordance with an embodiment of the present invention, the first and second reference voltages are 400 mV and 250 mV, respectively.

In accordance with an embodiment of the present invention, a method is provided. The method comprises disabling an LDO during a first mode; selecting a first reference voltage during the first mode; applying the first reference voltage to a switched-mode converter during the first mode; generating a first output voltage by the switched-mode converter from a power supply during the first mode; overcharging a first capacitor during the first mode with the first output voltage; enabling the LDO during a second mode; during a first portion of a startup period for the second mode, charging a second capacitor from the first capacitor; during the first portion of the startup period for the second mode, selecting a second reference voltage; applying the second reference voltage to the switched-mode converter during the first portion of the startup period for the second mode; and charging the second capacitor with the switched-mode converter during a second portion of the startup period for the second mode In accordance with an embodiment of the present invention, the switched-mode converter is a buck converter.

In accordance with an embodiment of the present invention, the power supply further comprises a battery.

In accordance with an embodiment of the present invention, the method further comprises: generating a control signal by a touch screen controller that indicates the first and second modes; using the control signal to perform the steps of selecting.

In accordance with an embodiment of the present invention, the first and second reference voltages are 400 mV and 250 mV, respectively.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
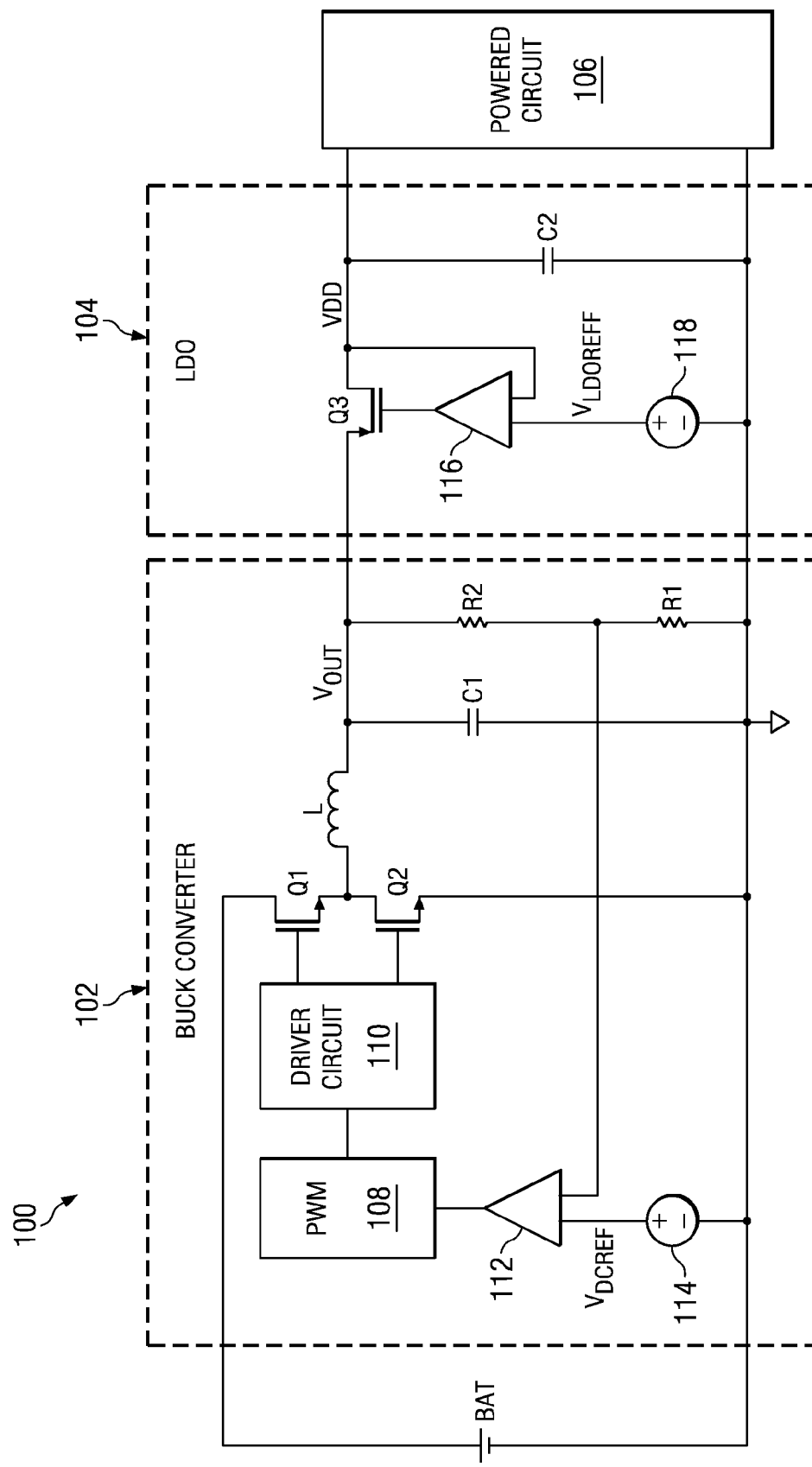
FIG. 1 is a diagram of an example of a conventional system.

Refer now to the drawings wherein depicted elements are, for the sake of clarity, not necessarily shown to scale and wherein like or similar elements are designated by the same reference numeral through the several views.

Figure 3:
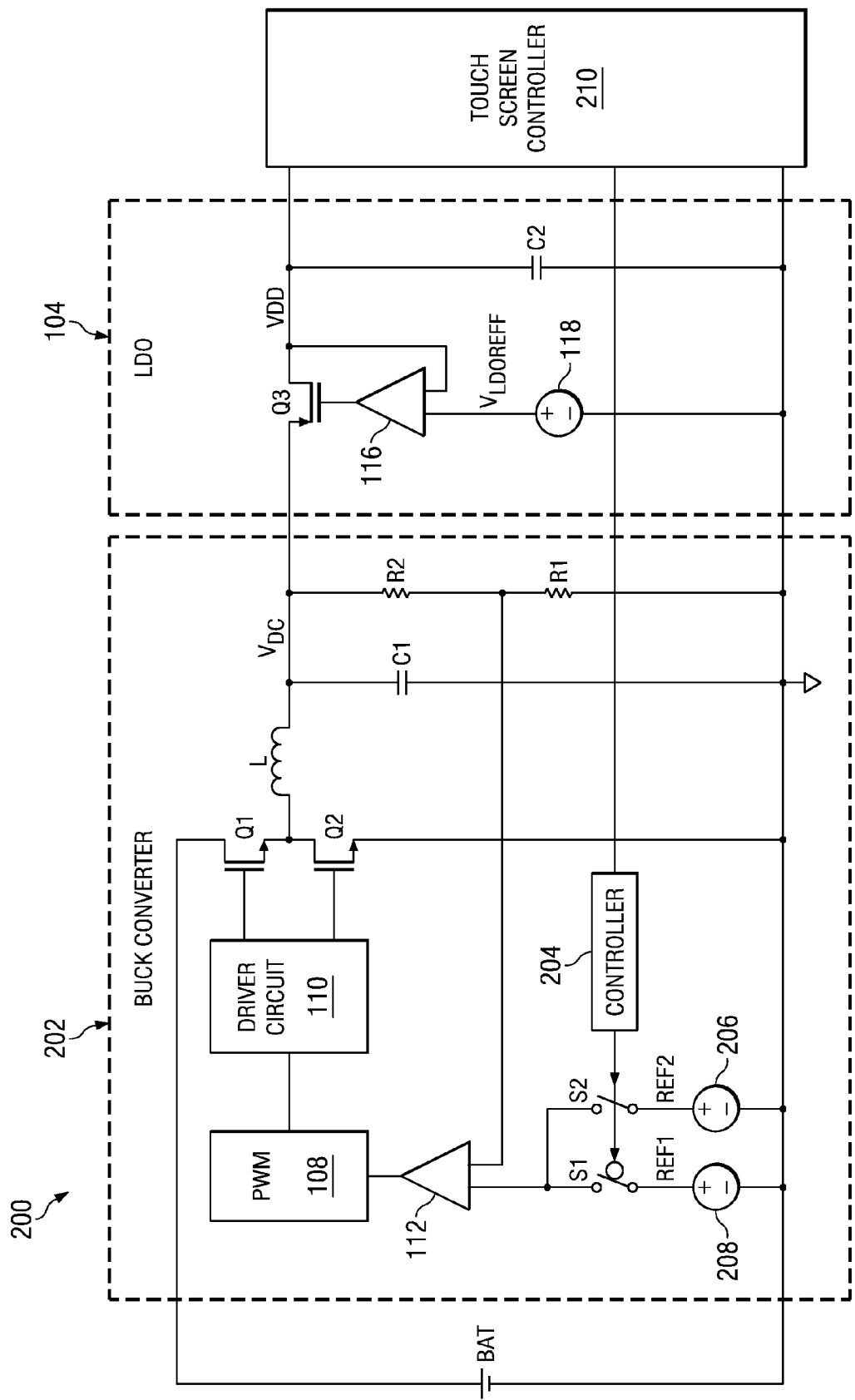
FIG. 3 is a diagram of an example of a system in accordance with an embodiment of the present invention.

Turning to FIG. 3, an example of a system 200 in accordance with an embodiment of the present invention can be seen. As shown, system 200 is similar in construction to system 100, except that buck converter 202 generally includes a switch network (which generally comprises switches S1 and S2), a controller 204, and voltage sources 206 and 208. Additionally, the buck converter 202 and LDO 104 are used (in this example) to power a touch screen controller 210 from a battery BAT. This configuration for system 200 (and for buck converter 202, in particular) uses the capacitor C1 as a charge source to shorten the startup period for LDO 104.

Figure 2:
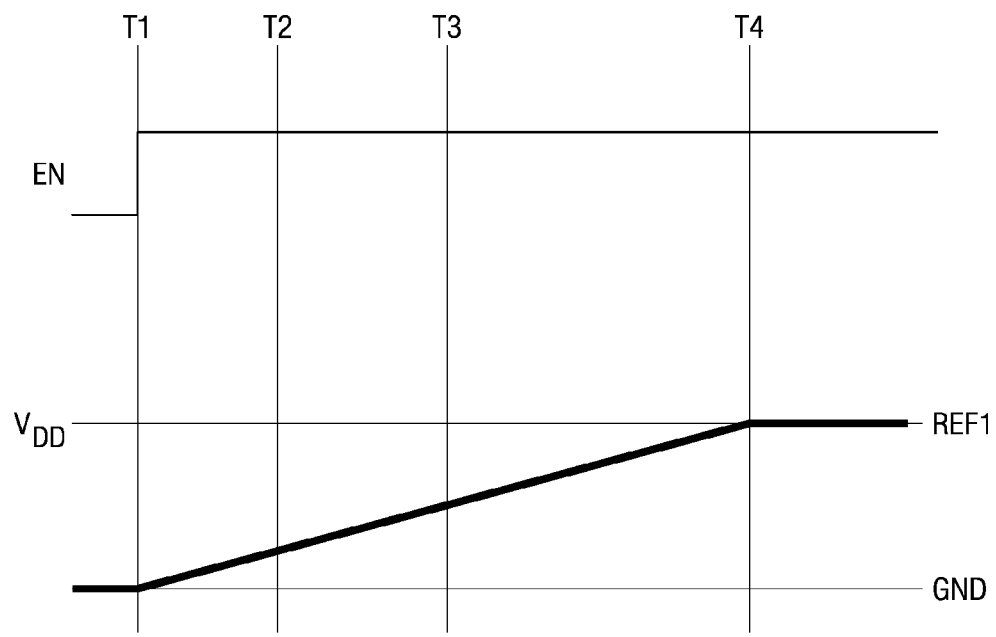
FIG. 2 is a timing diagram depicting the startup mode for the system of FIG. 1.
Figure 4:
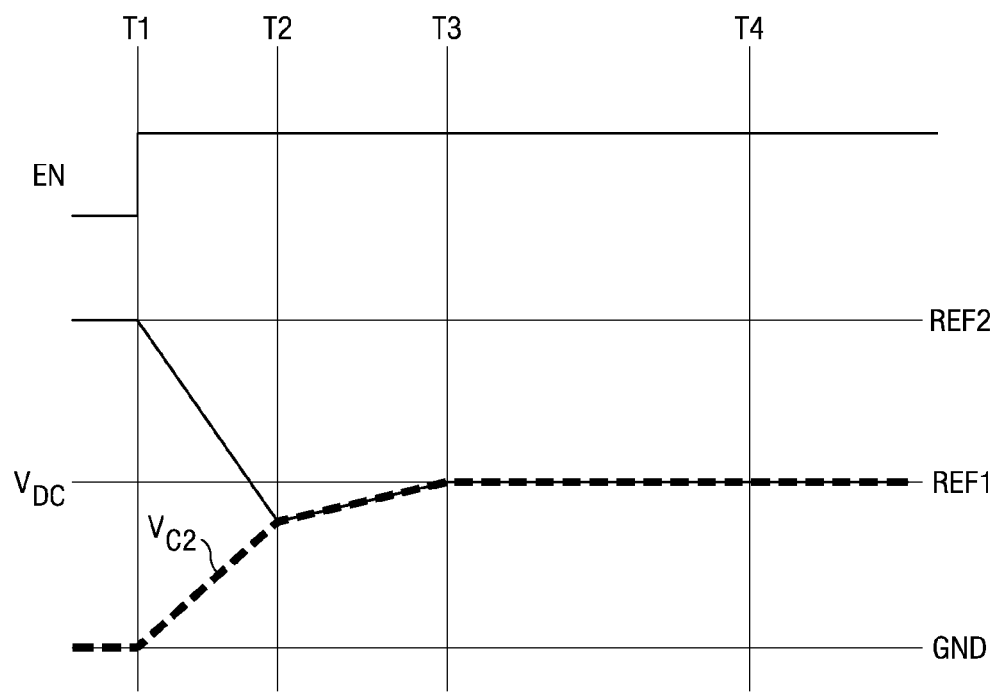
FIG. 4 is a timing diagram depicting an example operation of the system of FIG. 3.

As shown in FIG. 4, the startup period for LDO 104 is substantially shortened to the interval between times T1 and T3 (as opposed to the interval between times T1 and T4 with system 100). Before time T1, the LDO is in an "off" state or is disabled, and, while the LDO is in this disabled state, the controller 204 configures the switch network such that the reference voltage REF2 (which can, for example, be 400 mV) is provided to error amplifier 112 (i.e., switch S2 is "on" and switch S1 is "off"). This allows the buck converter 202 to overcharge capacitor C1. Then, at time T1, the enable signal EN is asserted by touch screen controller 210 so as to re-enable the LDO 104 and cause the controller 204 to configure the switch network such that the reference voltage REF1 (which can, for example, be 250 mV) is provided to error amplifier 112 (i.e., switch S1 is "on" and switch S2 is "off"). During the initial interval of the startup period (i.e., between times T1 and T2), capacitor C1 (which was overcharged when the LDO 104 was disabled) is used to begin charging capacitor C2, and the rate of charge of the voltage $V_{C2}$ on capacitor C2 is $$\frac{dV_{C2}}{dt} = \frac{I_{LDO}}{C2}, \quad (1)$$

where ILDO is the current output from transistor Q3. This also causes the output voltage VDC from buck converter 202 to decrease from reference voltage REF2. At time T2, the output voltage VDC and capacitor voltage $V_{C2}$ are approximately equal. During the interval between times T2 and T3, the rate of change of voltage $V_{C2}$ becomes:

$$\frac{dV_{C2}}{dt} = \frac{I_{DCDC}}{C1 + C2} \quad (2)$$

where IDCDC is the current output from buck converter 202. Thus, when comparing the startup times seen in FIGS. 2 and 4, the startup time for system 200 is substantially shorter (typically, on the order of 3 to 10 times shorter).

There are also several alternative arrangements for the system 200. In one example, buck converter 202 can be replaced with a boost converter or another switched-mode converter. In another example, touch screen controller 210 can be replaced with a radio or other sensitive circuitry. As another example, transistor Q2 can be replaced by a diode when the switched-mode converter (i.e., 202) is a buck converter, and transistor Q1 can be replaced by a diode when the switched-mode converter (i.e., 202) is a boost converter

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus including a linear regulator comprising:
   a first capacitor;
   a plant that receives an input current and an input voltage and that is coupled to the linear regulator, wherein the plant includes the first capacitor;
   a first controller including a comparator that is coupled to the plant and that controls the plant, wherein the output of the comparator is coupled to a pulse width modulator (PWM), wherein an output of the pulse width modulator is coupled to a driver circuit of the plant;
   a switch network that is coupled to the first controller and that receives one of a first reference voltage and a second reference voltage, wherein the second reference voltage is greater than the first reference voltage; and
   a second controller that provides a control signal to the switch network, wherein the second controller enables the switch network to provide the second reference voltage to the first controller when the linear regulator is disabled so as to overcharge the first capacitor, and wherein the first capacitor charges a second capacitor during a first portion of a startup period for the linear regulator, and wherein the second controller enables the switch network to provide the first reference voltage to the first controller during a second portion of the startup period,
   wherein the linear regulator further comprises a low dropout regulator (LDO) having:
      a transistor having a first passive electrode, a second passive electrode, and a control electrode, wherein the first passive electrode of the transistor is coupled to the plant;
      an amplifier having a first input terminal, a second input terminal, and an output terminal, wherein the first input terminal of the amplifier receives a third reference voltage, and wherein the second input terminal of the amplifier is coupled to the second passive electrode of the transistor, and wherein the output terminal of the amplifier is coupled to the control electrode of the transistor; and
      the second capacitor is coupled to the second passive electrode of the transistor.

2. The apparatus of claim 1, wherein the transistor further comprises a first transistor, and wherein the plant further comprises:
   a second transistor having a first passive electrode, a second passive electrode, and a control electrode, wherein the first passive electrode of the second transistor receives the input current and the input voltage;
   a third transistor having a first passive electrode, a second passive electrode, and a control electrode, wherein the first passive electrode of the third transistor is coupled to the second passive electrode of the second transistor at a switching node;
   an inductor that is coupled between the switching node and an output node, wherein a first output current and voltage are provided at the output node, and wherein the first capacitor is coupled to the output node; and
   wherein the driver circuit is coupled to the control electrodes of the second and third transistors.

3. The apparatus of claim 2, wherein the first controller further comprises:
   a voltage divider that is coupled to the output node;
   an error amplifier that is coupled to the voltage divider and the switch network; and
   wherein the pulse width modulator (PWM) is coupled to the error amplifier and the driver circuit.

4. The apparatus of claim 3, wherein the switch network further comprises:
   a first switch that is coupled to the error amplifier, that receives the first reference voltage, and that is controlled by the second controller; and
   a second switch that is coupled to the error amplifier, that receives the second reference voltage, and that is controlled by the second controller.

5. An apparatus comprising:
   a power supply;
   a touch screen controller having a first mode and a second mode;
   a linear regulator having a second capacitor, wherein the linear regulator is coupled to the touch screen controller, and wherein the linear regulator is disabled during the first mode of the touch screen controller, and wherein the linear regulator is enabled during the second mode; and
   a switched-mode converter having:
      a plant that is coupled between the linear regulator and the power supply, wherein the plant includes a first capacitor;
      a first controller including a comparator that is coupled to the plant and that controls the plant, wherein the output of the comparator is coupled to a pulse width modulator, wherein an output of the pulse width modulator is coupled to a driver circuit of the plant;
      a switch network that is coupled to the first controller and that receives a first reference voltage and a second reference voltage, wherein the first reference voltage is greater than the second reference voltage; and
      a second controller that provides a control signal to the switch network, wherein the second controller enables the switch network to provide the first reference voltage to the first controller during the first mode so as to overcharge the first capacitor, and wherein the first capacitor charges the second capacitor during a first portion of a startup period for the second mode, and wherein the second controller enables the switch network to provide the second reference voltage to the first controller during a second portion of the startup period for the second mode, wherein the linear regulator further comprises an LDO having:
a transistor having a first passive electrode, a second passive electrode, and a control electrode, wherein the first passive electrode of the transistor is coupled to the plant;
an amplifier having a first input terminal, a second input terminal, and an output terminal, wherein the first input terminal of the amplifier receives a third reference voltage, and wherein the second input terminal of the amplifier is coupled to the second passive electrode of the transistor, and wherein the output terminal of the amplifier is coupled to the control electrode of the transistor; and
wherein the second capacitor is coupled to the second passive electrode of the transistor.

6. The apparatus of claim 5, wherein the transistor further comprises a first transistor, and wherein the plant further comprises:
a second transistor having a first passive electrode, a second passive electrode, and a control electrode, wherein the first passive electrode of the second transistor receives an input current and voltage;
a third transistor having a first passive electrode, a second passive electrode, and a control electrode, wherein the first passive electrode of the third transistor is coupled to the second passive electrode of the second transistor at a switching node;
an inductor that is coupled between the switching node and an output node, wherein a first output current and voltage are provided at the output node, and wherein the first capacitor is coupled to the output node; and
wherein the driver circuit is coupled to the control electrodes of the second and third transistors.

7. The apparatus of claim 6, wherein the first controller further comprises:
a voltage divider that is coupled to the output node;
an error amplifier that is coupled to the voltage divider and the switch network; and
wherein the pulse width modulator is coupled to the error amplifier and the driver circuit.

8. The apparatus of claim 7, wherein the switch network further comprises:
a first switch that is coupled to the error amplifier, that receives the first reference voltage, and that is controlled by the second controller; and a second switch that is coupled to the error amplifier, that receives the second reference voltage, and that is controlled by the second controller.

9. The apparatus of claim 8, wherein the first transistor further comprises a PMOS transistor, and wherein the second and third transistors further comprise first and second NMOS transistors.

10. The apparatus of claim 9, wherein the power supply is a battery.

11. The apparatus of claim 10, wherein the first and second reference voltages are 250 mV and 400 mV, respectively.

12. A method comprising:
disabling an LDO during a first mode;
selecting a first reference voltage during the first mode;
applying the first reference voltage to a switched-mode converter during the first mode;
generating a first output voltage by the switched-mode converter from a power supply during the first mode;
overcharging a first capacitor during the first mode with the first output voltage;
enabling the LDO during a second mode;
during a first portion of a startup period for the second mode, charging a second capacitor from the first capacitor;
during the first portion of the startup period for the second mode, selecting a second reference voltage;
applying the second reference voltage to the switched-mode converter during the first portion of the startup period for the second mode; and
charging the second capacitor with the switched-mode converter during a second portion of the startup period for the second mode,
wherein the first reference voltage is greater than the second reference voltage.

13. The method of claim 12, wherein the switched-mode converter is a buck converter.

14. The method of claim 13, wherein the power supply further comprises a battery.

15. The method of claim 14, wherein the method further comprises: generating a control signal by a touch screen controller that indicates the first and second modes; and using the control signal to perform the steps of said selecting the first and second reference voltages.

16. The method of claim 15, wherein the first and second reference voltages are 400 mV and 250 mV, respectively.

* * * * *